(12) United States Patent
Iwamura (10) Patent No.: US 7,769,301 B2
(45) Date of Patent: Aug. 3, 2010

(54) OPTICAL CODE DIVISION MULTIPLEXING RECEIVING DEVICE AND TIME GATE PROCESSING METHOD IN OPTICAL CODE DIVISION MULTIPLEXING RECEIVING DEVICE

(75) Inventor: Hideyuki Iwamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 973 days.

(21) Appl. No.: 11/522,336

(22) Filed: Sep. 18, 2006

(65) Prior Publication Data
US 2007/0077070 A1 Apr. 5, 2007

(30) Foreign Application Priority Data
Sep. 22, 2005 (JP) .............................. 2005-275166

(51) Int. Cl.
*H04B 10/00* (2006.01)
(52) U.S. Cl. .............................. 398/155; 398/77; 398/78
(58) Field of Classification Search ............. 398/75–79, 398/98–99, 155
See application file for complete search history.

(56) References Cited

U.S. PATENT DOCUMENTS

2005/0084266 A1* 4/2005 Pohjola et al. ................. 398/77
2005/0180750 A1* 8/2005 Wada et al. .................... 398/49
2006/0120434 A1* 6/2006 Fathallah et al. ............. 375/132

OTHER PUBLICATIONS

"3-1 Optical Code Division Multiplexing And Its Application to Peta-bit/s Photonic Network", Hideyuki Sotobayashi et al., Journal of the National Institute of Information and Communications Technology, vol. 48, No. 1, 2002.
"Transparent Virtual Optical Code/Wavelength Path Network", Hideyuki Sotobayashi et al., IEEE Journal of Selected Topics in Quantum Electronics, vol. 8, No. 3, May/Jun. 2002.

* cited by examiner

*Primary Examiner*—Dzung D Tran
(74) *Attorney, Agent, or Firm*—Rabin & Berdo, P.C.

(57) ABSTRACT

Technology is provided in which, by performing time gate processing using a clock signal with time jitter suppressed, time and intensity fluctuations which in the prior art had been observed in auto-correlated signals after time gate processing are reduced. In a decoder, received optical code division multiplexed signals are divided into two, one of which is reflected as a decoded signal, and the other of which is transmitted as an encoded signal in the encoded state. In the clock extraction circuit, encoded signals are divided into first encoded signals and second encoded signals. In the first clock signal generation portion, first clock signals are generated from the first encoded signals, and optical pulses synchronized with the first clock signals are extracted from the second encoded signals, and second clock signals are generated from the extracted optical pulses. In the time gate processor, time gate processing of the decoded signal is performed, using the second clock signals as the gate signals, and the result is output.

2 Claims, 9 Drawing Sheets

OPTICAL CODE DIVISION MULTIPLEXING RECEIVING DEVICE AND TIME GATE PROCESSING METHOD IN OPTICAL CODE DIVISION MULTIPLEXING RECEIVING DEVICE

BACKGROUND OF THE INVENTION

1. Field of the Invention

This invention relates to an optical code division multiplexing receiving device, and to a time gate processing method in the optical code division multiplexing receiving device.

2. Description of Related Art

In order to increase communication capacity, Optical Time Division Multiplexing (OTDM), Wavelength Division Multiplexing (WDM), Optical Code Division Multiplexing (OCDM), and other optical multiplexing technologies, in which a plurality of channels of optical pulse signals are transmitted together in a single optical fiber transmission path, are being studied. Among these optical multiplexing technologies, OCDM has the excellent characteristic that there is no limit to the number of multiplexed channels when multiplexing optical pulse signals.

Using OCDM communication, transmission is performed as follows. On the transmitting side, codes which are different for each channel are used to encode optical pulse signals. On the receiving side, decoding is performed using the same codes as those used for encoding on the transmitting side, to obtain the original optical pulse signals. Methods for encoding and decoding in OCDM communication include time-spreading methods, wavelength-hopping methods, time-spreading wavelength-hopping methods, and similar. In this invention, a time-spreading wavelength-hopping method is used.

Time-spreading wavelength-hopping methods will be explained referring to FIG. 1 through FIG. 4. For convenience of explanation, a reference to an optical pulse train refers to the entirety of optical pulses arranged at equal intervals on the time axis. Further, a reference to an optical pulse signal is used only to mean an optical pulse train which reflects binary digital electrical signals.

Figure 1:
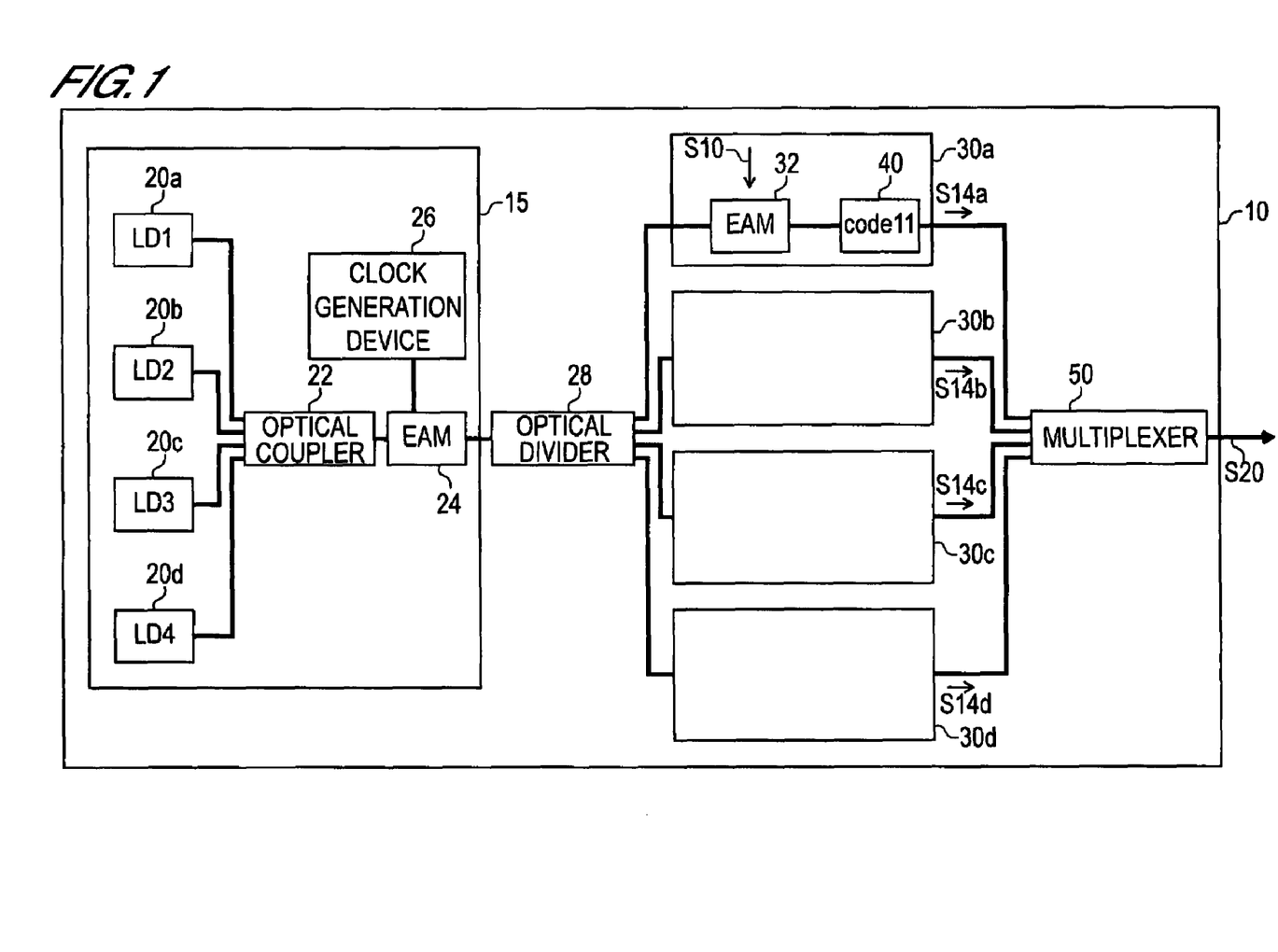
FIG. 1 is a block diagram of an OCDM transmission device which uses a time-spreading wavelength-hopping method.

FIG. 1 is a block diagram of a transmission device used in OCDM communication (hereafter simply called an OCDM transmission device), which employs a time-spreading wavelength-hopping method.

The OCDM transmission device 10 comprises a multi-wavelength pulsed light source 15, optical divider 28, first through fourth transmission portions 30a to 30d, and multiplexer 50.

The multi-wavelength pulsed light source 15 is a light source which outputs an optical pulse train in which light of a plurality of wavelengths is included. Here, an example will be explained in which the multi-wavelength pulsed light source 15 outputs an optical pulse train containing four wavelength components, with the mutually different wavelengths $\lambda 1$, $\lambda 2$, $\lambda 3$, and $\lambda 4$.

The multi-wavelength pulsed light source 15 comprises first through fourth light sources 20a to 20d, an optical coupler 22, an optical pulse train generator 24, and a clock generation device 26. As the first through fourth light sources 20a to 20d, for example, semiconductor laser diodes (LDs) are used. The first through fourth light sources 20a to 20d each output continuous light at a single wavelength, the wavelengths of which are respectively $\lambda 1$, $\lambda 2$, $\lambda 3$, $\lambda 4$. The continuous light output from the first through fourth light sources 20a to 20d is input to the optical coupler 22, and is multiplexed into continuous light comprising the $\lambda 1$, $\lambda 2$, $\lambda 3$, and $\lambda 4$ wavelength components. Continuous light output from the optical coupler 22 comprising the $\lambda 1$, $\lambda 2$, $\lambda 3$, $\lambda 4$ wavelength components is input into the optical pulse train generator 24. The optical pulse train generator 24 is for example configured using an Electro-absorption Modulator (EAM). An electrical clock signal, generated by the clock generation device 26, is input to the optical pulse train generator 24. The optical pulse train generator 24 uses the input electrical clock signal to perform modulation, to generate an optical pulse train with period equal to the period of the electrical clock signal. Each of the optical pulses in the optical pulse train comprises the wavelength components $\lambda 1$ through $\lambda 4$.

The optical pulse train generated by the multi-wavelength pulsed light source 15 is divided into four trains by the optical divider 28, which are input to the first through fourth transmission portions 30a to 30d. The first through fourth transmission portions 30a to 30d are configured similarly, and so the first transmission portion 30a is explained as representative, and explanations of the second through fourth transmission portions 30b to 30d are omitted.

The optical pulse train input to the first transmission portion 30a is first input to the optical pulse signal generator 32. The optical pulse signal generator 32 is for example configured using an EAM. A binary digital electrical signal (in the figure, indicated by an arrow S10) is input to the gate of the optical pulse signal generator 32. The optical pulse signal generator 32 generates from the input optical pulse train and outputs optical pulse signals which reflect the signal pattern of the binary digital electrical signal S10.

The optical pulse signals output from the optical pulse signal generator 32 are input to the encoding portion 40 and encoded thereat. The encoding portion 40 is for example configured using a fiber Bragg grating (FBG), and by imparting different delays for each wavelength, encodes the input optical pulse signals. Here, the code used in encoding by the encoding portion comprised by the first transmission portion 30a is assumed to be code 11. Signals encoded in the first transmission portion 30a are called first encoded transmission signals (in the figure, indicated by an arrow S14a).

Similarly in the second through fourth transmission portions 30b to 30d, optical pulse signals reflecting the signal pattern of binary digital electrical signals are generated from an input optical pulse train in an EAM used as an optical pulse signal generator. The generated optical pulse signals are encoded using mutually different codes by the encoding portions comprised by the second through fourth transmission portions 30b to 30d. Here, the codes used in encoding by the encoding portions comprised by the second through fourth transmission portions 30b to 30d are assumed to be, for example, code 12 to code 14. As a result, second encoded transmission signals (indicated by an arrow S14b in the figure), third encoded transmission signals (indicated by an arrow S14c in the figure), and fourth encoded transmission signals (indicated by an arrow S14d in the figure) are output from the second through fourth transmission portions 30b to 30d, respectively.

The optical pulse signals encoded by the first through fourth transmission portions 30a to 30d are multiplexed in the multiplexer 50, and are transmitted. Here, signals resulting from multiplexing of encoded optical pulse signals (indicated by an arrow S20 in the figure) are here called optical code division multiplexed (OCDM) signals.

Figure 2A:
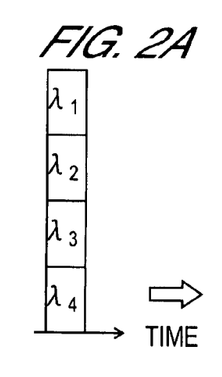
FIG. 2A and FIG. 2C show one optical pulse of an optical pulse signal.
Figure 2B:
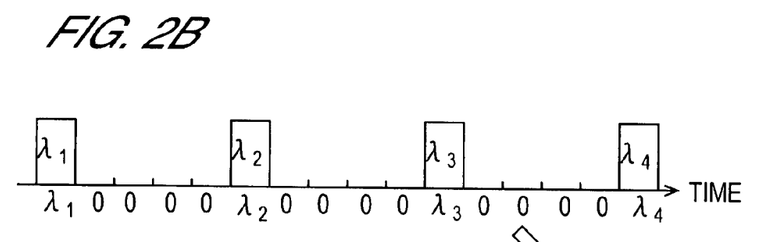
FIG. 2B shows signals encoded using codes given by code11.
Figure 2C:
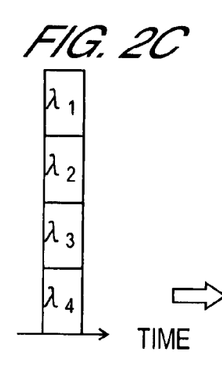

Encoding in OCDM communication using a time-spreading wavelength-hopping method will be explained, referring to FIG. 2A, FIG. 2B, FIG. 2C, FIG. 2D and FIG. 2E. Here, for simplicity, an example of dual-multiplexing OCDM will be explained, in which signals encoded using two different codes are multiplexed. FIG. 2A and FIG. 2C show optical pulses for one optical pulse signal. In the optical pulse shown in FIG. 2A, wavelength components λ1 to λ4 are included. This optical pulse is encoded using codes given by code 11. As a result, the signal is analyzed into optical pulses by wavelength components, as shown in FIG. 2B, and different delays are imparted to each wavelength component, so that the wavelength components are arranged at different positions on the time axis.

Figure 2D:
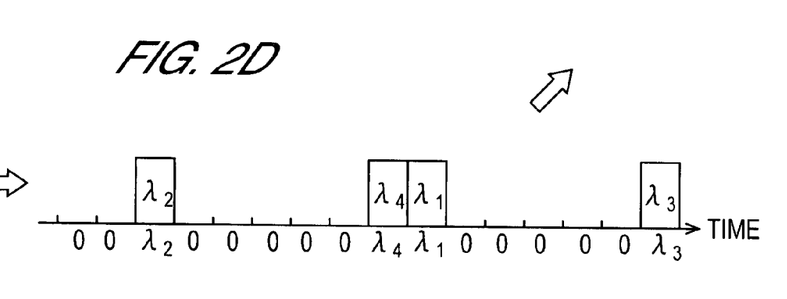
FIG. 2D shows signals encoded using a code given by code12.
Figure 2E:
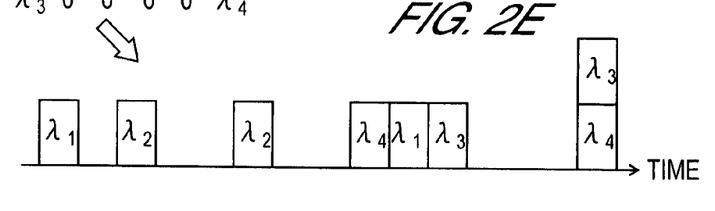
FIG. 2E shows dual-multiplexed OCDM signals.

Similarly, the optical pulse signals in which light at wavelengths λ1 to λ4 is included shown in FIG. 2C are encoded using the code given by code 12, different from code 11. Through this encoding, as shown in FIG. 2D, optical pulses in which wavelength components at λ1 to λ4 are included are analyzed into optical pulses of each wavelength component, and different delays are imparted to each wavelength component, so that the wavelength components are arranged at different positions on the time axis. Signals encoded using code 11 and signals encoded using code 12 are multiplexed, to result in dual-multiplexed OCDM signals, as shown in FIG. 2E.

Figure 3:
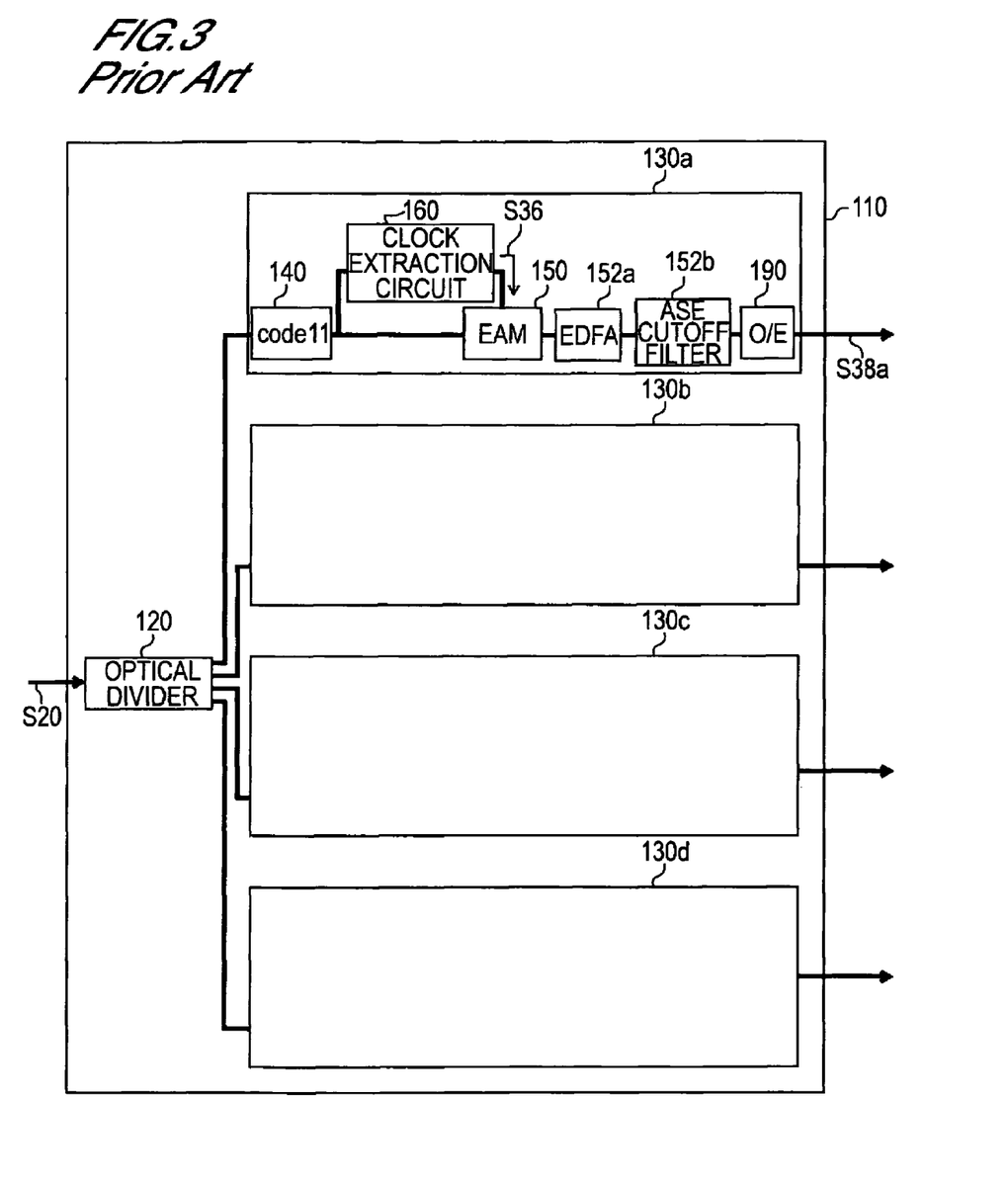
FIG. 3 is a block diagram of a conventional example of an OCDM receiving device which uses time-spreading wavelength-hopping.

FIG. 3 is a block diagram of a conventional example of a receiving device for OCDM communication (hereafter simply called an OCDM receiving device), used in time-spreading wavelength-hopping methods.

The OCDM receiving device 110 comprises an optical divider 120 and first through fourth reception portions 130a to 130d. OCDM signals S20 received by the OCDM receiving device 110 are divided by the optical divider 120 and sent to the first through fourth reception portions 130a to 130d. The first through fourth reception portions 130a to 130d are configured similarly, and so the first reception portion 130a will be explained as representative, and explanations of the second through fourth reception portions 130b to 130d are omitted.

The first reception portion 130a comprises a decoding portion 140, time gate processor 150, clock extraction circuit 160, and photoelectric converter 190. The decoding portion 140 in the first reception portion 130a has the same code (code 11) as the encoding portion 40 in the first transmission portion 30a, explained referring to FIG. 1. Similarly, the decoding portions in the second through fourth reception portions 130b to 130d have the same codes (code 12 to code 14) as the encoding portions in the second through fourth transmission portions 30b to 30d, respectively.

Figures 4A, 4B:
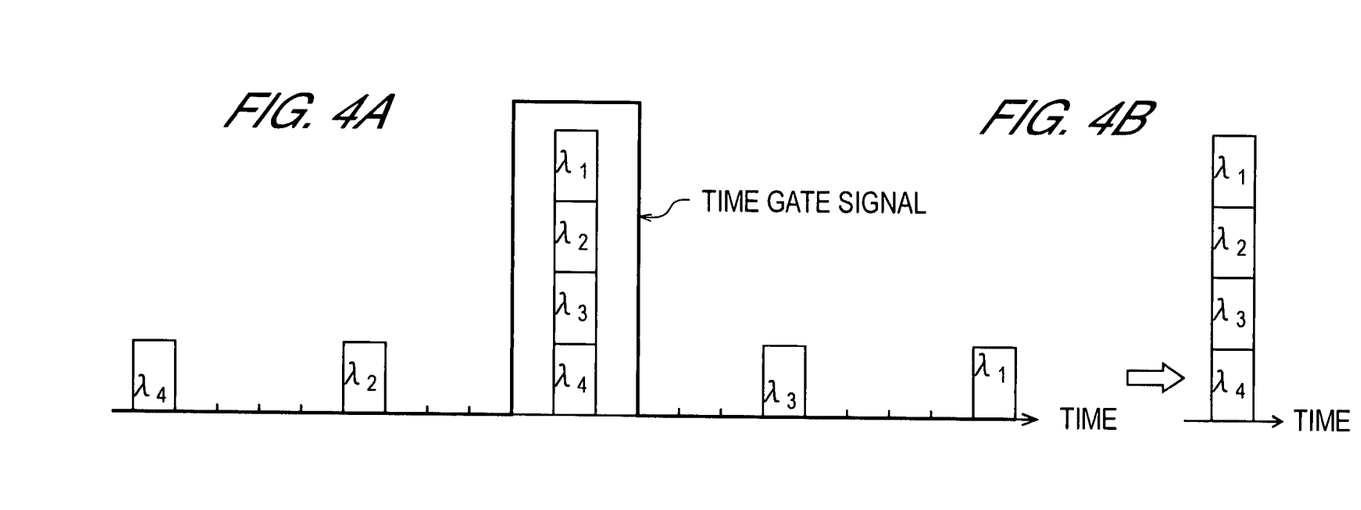
FIG. 4A shows signals decoded using codes given by code11.
FIG. 4B and FIG. 4D show signals extracted by time gate processing from the decoded signals.
Figures 4C, 4D:
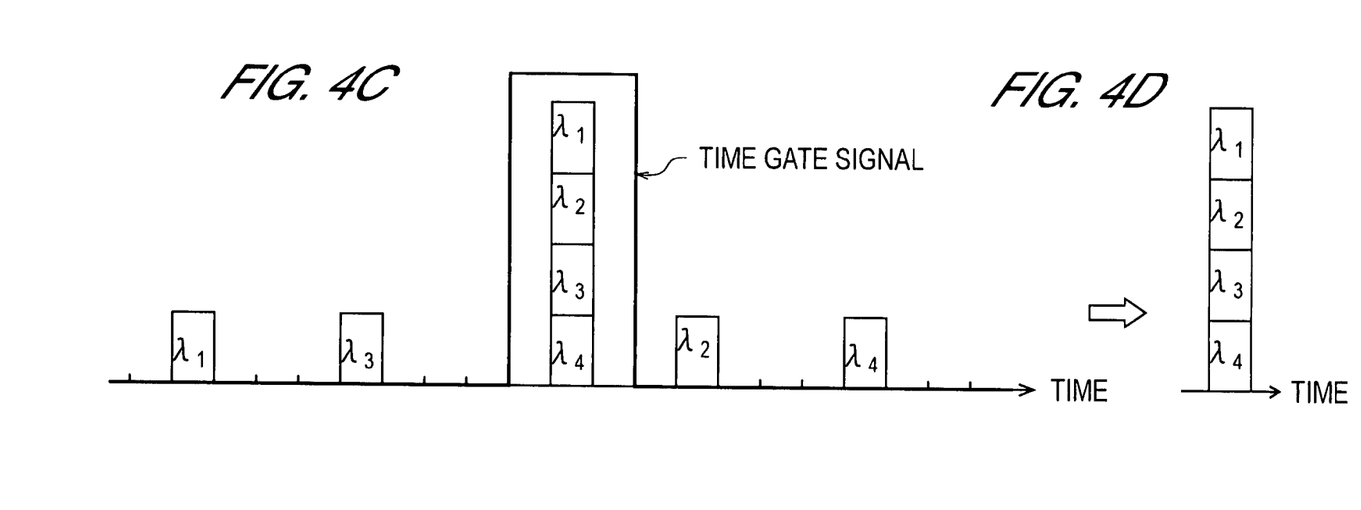
FIG. 4C shows signals decoded using codes given by code12.

Decoding in OCDM communications will be explained, referring to FIG. 4A, FIG. 4B, FIG. 4C, and FIG. 4D. Here, decoding of dual-multiplexed OCDM signals, explained referring to FIG. 2, is used as an example. FIG. 4A through FIG. 4D is a diagram used to explain decoding of dual-multiplexed OCDM signals. FIG. 4A shows signals resulting from decoding of received OCDM signals using a code given by code 11. FIG. 4C shows signals decoded from received OCDM signals using the code given by code 12.

As shown in FIG. 4A and FIG. 4C, optical pulse signals decoded by each of the decoders comprise auto-correlated signals and cross-correlated signals. Auto-correlated signals are the signals decoded using the same code which is used for encoding. Cross-correlated signals are the signals decoded using the different code which is used for encoding. For example, in the case of optical pulse signals decoded by the decoder in the first reception portion 130a (which hereafter may be called the first decoder), optical pulse signals decoded by the first decoder from the first encoded transmission signals, obtained by encoding using the code provided by code 11, are auto-correlated signals. On the other hand, optical pulse signals decoded by the first decoder from second optical encoded signals, obtained by encoding using the code provided by code 12, are cross-correlated signals. Similarly in the case of optical pulse signals decoded by the decoder in the second reception portion 130b (which hereafter may be called the second decoder), optical pulse signals decoded by the second decoder from second optical encoded signals are auto-correlated signals, while optical pulse signals decoded by the second decoder from first optical encoded signals are cross-correlated signals.

Here, in the optical pulse signals obtained as a result of decoding, cross-correlated signals result in so-called interference noise. When the number of multiplexed signals increases due to encoding, interference noise due to cross-correlated signals increases, so that the error rate for encoded signals increases. Hence in order to reduce the signal error rate, time gate processing is performed (see for example Literature 1: Hideyuki Sotobayashi, Wataru Chujo and Ken-ichi Kitayama, "3-1 Optical Code Division Multiplexing And Its Application to Peta-bit/s Photonic Network", Journal of the National Institute of Information and Communications Technology, Vol. 48, No. 1, 2002).

Here, time gate processing is processing to extract signals at desired time intervals. In other words, time gate processing is processing in which a gate is opened to allow decoded signals to pass only during the time in which an auto-correlated signal is input, whereas the gate is closed during the time in which a cross-correlated signal is input, so that only auto-correlated signals are extracted. FIG. 4B and FIG. 4D show signals extracted by time gate processing of signals decoded by the first decoder and by the second decoder respectively. In order to perform this time gate processing, a clock signal which specifies the time interval of the time gate is necessary. Hence in the reception portion, it is necessary to extract a clock signal of the same frequency as the electrical clock signal of the transmission portion.

In a conventional OCDM receiving device, signals decoded by the decoding portion 140 are divided into two signals, one of which is sent to the clock extraction circuit 160, and this clock extraction circuit 160 extracts the clock signal (indicated by the arrow S36 in FIG. 3) (see for example Literature 2: Hideyuki Sotobayashi, Wataru Chujo and Ken-ichi Kitayama, "Transparent Virtual Optical Code/Wavelength Path Network", IEEE Journal of Selected Topics in Quantum Electronics, Vol. 8, No. 3, May/June 2002).

Signals which have been decoded by the decoding portion 140 are input to the time gate processor 150. As the time gate processor 150 which performs time gate processing, for example, an EAM can be used. The clock signals S36 extracted by the clock extraction circuit 160 are input to the gate of the time gate processor 150, and only the auto-correlated signals are extracted. The signals output from the time gate processor 150 are amplified by the optical amplifier 152a. As the optical amplifier 152a, for example, an erbium-doped optical fiber amplifier can be used. An ASE cutoff filter 152b is placed at the output portion of the optical amplifier 152a, and Amplified Spontaneous Emission (ASE) components contained in the signals output from the optical amplifier 152a are removed. Signals output from this ASE cutoff filter 152b are input to the photoelectric converter 190, and after conversion into electrical signals, are output.

However, in a conventional OCDM receiving device as disclosed in Literature 2, clock signals are extracted from decoded signals, and so the clock signals have substantial time jitter. Consequently, fluctuations occur in auto-correlated signals after time gate processing.

Hence upon conducting diligent research, the inventors of this application discovered that, in the reception portion, by performing extraction before decoding, that is, by extracting clock signals from encoded signals in the encoded state, time jitter can be reduced.

It is therefore an object to provide a receiving device for OCDM communication in which, by performing time gate processing using clock signals in which time jitter has been suppressed, time jitter and intensity jitter in auto-correlated signals after time gate processing, which are observed in the prior art, are reduced.

Another object of the invention is to provide a clock extraction method in a receiving device for OCDM communication.

SUMMARY OF THE INVENTION

According to a first aspect of this invention, an optical code division multiplexing (OCDM) receiving device is provided, comprising a decoding portion, a time gate processor, and a clock extraction circuit. The OCDM receiving device receives and decodes optical code division multiplexed signals, encoded by a time-spreading wavelength-hopping method.

The decoding portion generates decoded signals which are decoded and encoded signals in an encoded state from the optical code division multiplexed signals. The clock extraction circuit comprises first and second clock signal generation portions. The first clock signal generation portion generates first clock signals from first encoded signals obtained by dual dividing of the encoded signals. The second clock generation portion extracts optical pulses synchronized with the first clock signals from second encoded signals obtained by dual dividing of the encoded signals, and generates second clock signals from the extracted optical pulses. The time gate processor outputs received signals by time gate processing of the decoded signals with the use of the second clock signals as gate signals.

It is preferable that the decoding portion comprise a fiber Bragg grating-type decoder, which separates the optical code division multiplexed signals into two, with one decoded and reflected as decoded signals and the other transmitted as encoded signals in the encoded state, and a circulator, which sends optical code division multiplexed signals received by the optical code division multiplexing receiving device to the decoder, and which sends decoded signals input from the decoder to the time gate processor.

According to a second aspect of this invention, a time gate processing method in an optical code division multiplexing receiving device is provided in which, after generating first clock signals from encoded signals in the encoded state, optical pulses extracted using the first clock signals are used to generate second clock signals, and the second clock signals, with time jitter thereof suppressed, are used to perform time gate processing.

By means of an optical code division multiplexing receiving device of this invention, and a time gate processing method of this invention in the optical code division multiplexing receiving device, by generating a clock signal from encoded signals in the encoded state, time jitter and intensity jitter in auto-correlated signals after time gate processing, which have been observed in the prior art, can be reduced.

In implementing the above-described optical code division multiplexing receiving device, it is preferable to configure the first clock signal generation portion by connecting, in this order, a photoelectric converter into which the first encoded signals are input, a band-pass filter, a limiting amplifier, and a first variable delay unit for outputting the first clock signals. Further, it is preferable to configure the second clock signal generation portion by connecting, in this order, an intensity modulator into which the second encoded signals are input, a 2R receiver, a clock recovery circuit, and a second variable delay unit for outputting the second clock signals.

In this way, using a limiting amplifier for generating the first clock signals, intensity jitter thereof can be further reduced. Furthermore, in generating the second clock signals, by using a clock reproduction circuit, time jitter thereof can be further reduced.

It is preferable that the clock extraction circuit comprise a wavelength filter, and that after encoded signals are passed through the wavelength filter, the signals are dual-divided into first encoded signals and second encoded signals, and the first encoded signals and second encoded signals are sent to the first clock signal generation portion and second clock signal generation portion, respectively.

With such a configuration, only the wavelength component necessary for clock extraction is passed, and unnecessary wavelength components can be eliminated.

It is preferable that the decoding portion comprises a decoder which decodes one of the signals resulting from dual-dividing of optical code division multiplexed signals received by the optical code division multiplexing receiving device, to generate decoded signals.

In this case, received optical code division multiplexed signals are divided into two signals, one of which is decoded by the decoder and sent as decoded signals to the time gate processor, and the other of which is sent to the clock extraction circuit as encoded signals in the encoded state.

BRIEF DESCRIPTION OF THE DRAWINGS

The foregoing and other objects, features and advantages of the present invention will be better understood from the following description taken in connection with the accompanying drawings, in which:

FIG. 2A through FIG. 2E are diagrams used to explain OCDM encoding used in a time-spreading wavelength-hopping method, in which

FIG. 4A through FIG. 4D are diagrams used to explain OCDM decoding using a time-spreading wavelength-hopping method, in which

FIG. 7A and FIG. 7B are eye diagrams of received signals, in which

FIG. 8A and FIG. 8B show the dependence on received light intensity of the code error rate, in which

DESCRIPTION OF THE PREFERRED EMBODIMENTS

With reference to the drawings, embodiments according to the invention will be explained hereinbelow. In the following, examples of preferable configurations of the invention will be explained; but the numerical conditions of constituent components and similar are merely preferable examples. Hence the invention is not limited to the following embodiments.

One example of an OCDM communication receiving device of this invention which receives three-wavelength code, quad-multiplexed OCDM signals will be explained. Here, a time-spreading wavelength-hopping method is used for encoding optical pulse signals. Specifically, optical pulse signals comprising four wavelength components, $\lambda 1$ to $\lambda 4$, are encoded using four codes each. Here a three-wavelength code, quad-multiplexed OCDM signal is an OCDM signal which is encoded with three wavelengths selected from among the four wavelengths $\lambda 1$ to $\lambda 4$ for each code during encoding. Here, the four codes are represented as code 1 to code 4.

For example, suppose that a signal encoded using code 1 comprises $\lambda 2$, $\lambda 3$ and $\lambda 4$ as wavelength components; a signal encoded using code 2 comprises $\lambda 1$, $\lambda 3$ and $\lambda 4$ as wavelength components; a signal encoded using code 3 comprises $\lambda 1$, $\lambda 2$ and $\lambda 4$ as wavelength components; and that a signal encoded using code 4 comprises $\lambda 1$, $\lambda 2$ and $\lambda 3$ as wavelength components.

Figure 5:
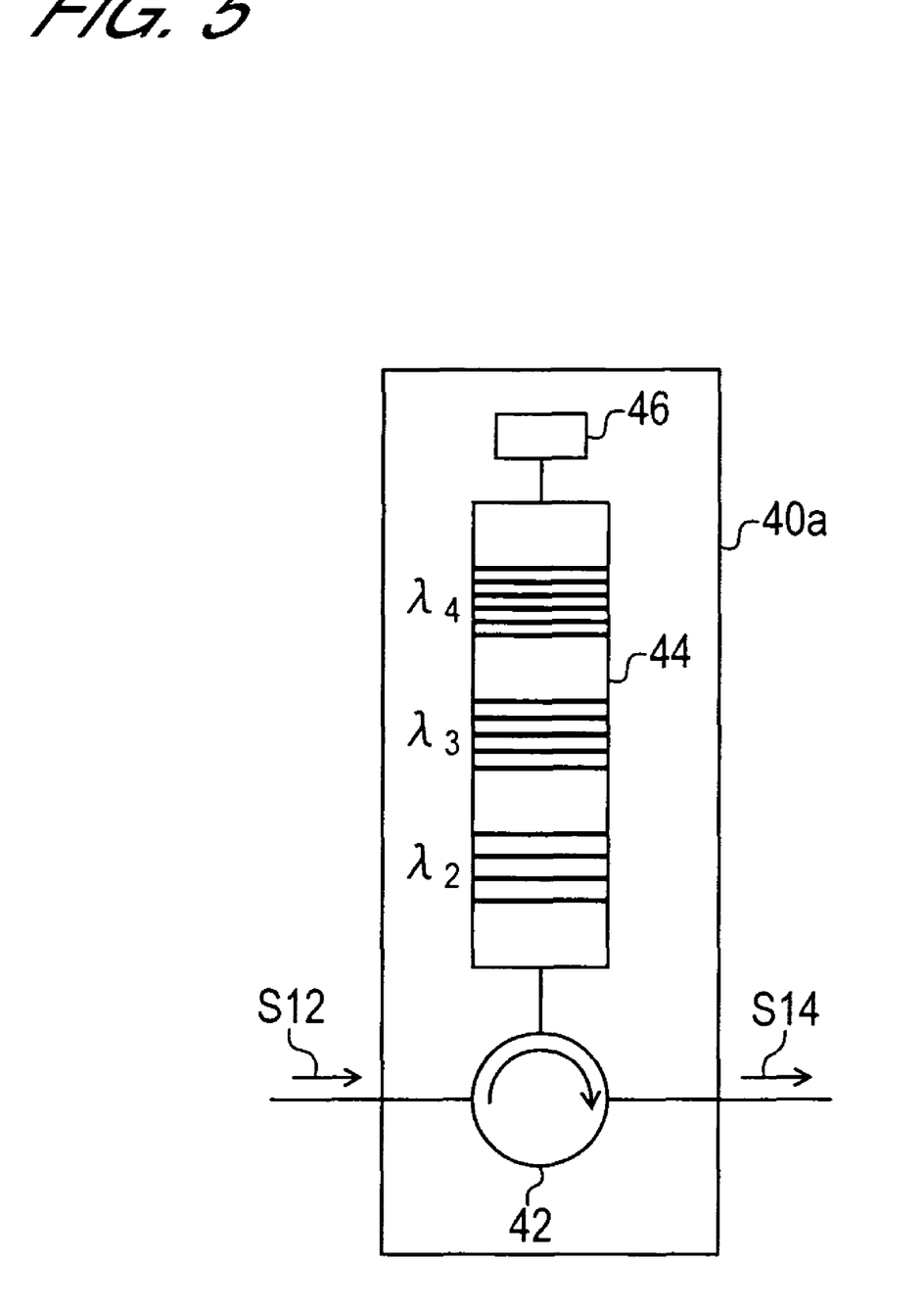
FIG. 5 is a diagram used to explain the encoding portion used in three-wavelength code quad-multiplexing OCDM.

The encoding portion used in three-wavelength code, quad-multiplexing OCDM will be explained referring to FIG. 5. FIG. 5 is a view for explaining the encoding portion used in three-wavelength code, quad-multiplexing OCDM, and showing an example of a case of encoding using a code represented by code 1.

The encoding portion 40a comprises a circulator 42, encoder 44, and terminator 46. Optical pulse signals (indicated by an arrow S12 in the figure) input to the encoding portion 40a pass through the circulator 42 and are sent to the encoder 44. The encoder 44 comprises, for example, a fiber Bragg grating. The encoder 44 is configured such that unit fiber Bragg gratings (unit FBG) are arranged in series with respect to the direction of propagation of light in the encoder 44. The total length of each unit FBG is the same, and the unit FBGs reflect light of wavelength $\lambda 2$, $\lambda 3$, and $\lambda 4$ respectively.

Of an optical pulse signal S12 in which wavelengths $\lambda 1$, $\lambda 2$, $\lambda 3$, $\lambda 4$ are intermixed, the $\lambda 2$ wavelength component of the light pulse is reflected from the unit FBG indicated by $\lambda 2$. Similarly, the $\lambda 3$ wavelength component of the light pulse is reflected from the unit FBG indicated by $\lambda 3$, and the $\lambda 4$ wavelength component of the light pulse is reflected from the unit FBG indicated by $\lambda 4$. The optical signals reflected by each of these unit FBGs pass through the circulator 42 and are output as encoded signals S14. In this way, in the encoding portion 40a, encoded signals S14 encoded using code1 are signals comprising wavelength components of wavelengths $\lambda 2$, $\lambda 3$ and $\lambda 4$.

An example of the configuration of an OCDM receiving device will be explained referring to FIG. 6.

The OCDM receiving device 111 comprises an optical divider 120 and first through fourth reception portions 131a to 131d. OCDM signals S20 received by the OCDM receiving device 111 are divided into four signals by the optical divider 120 and sent to the first through fourth reception portions 131a to 131d. The first through fourth reception portions 131a to 131d are configured similarly, and so the first reception portion 131a will be explained as representative, and explanations of the second through fourth reception portions 131b to 131d will be omitted.

The first reception portion 131a comprises an encoding portion 141, time gate processor 150, optical amplifier 152a, ASE cutoff filter 152b, clock extraction circuit 161, and photoelectric converter 190.

The encoding portion 141 comprised by the first reception portion 131a comprises a circulator 143 and a decoder 145, and has the same code (code 1) as the encoding portion of the first transmission portion 30a. When the encoding portion 40 comprised by the first transmission portion 30a is configured using an FBG as explained referring to FIG. 5, the decoder 145 comprised by the first reception portion 131a can be the same as the encoder comprised by the first transmission portion 30a. In this case, the decoder 145 comprised by the decoding portion 141 is connected to the circulator 143 at the terminal opposite that of the encoder 44 comprised by the encoding portion 40.

The circulator 143 sends one of the signals of the four OCDM signals divided by the optical divider 120 to the decoder 145, and sends the decoded signal input from the decoder 145 to the time gate processor 150.

The decoder 145 comprised by the first reception portion 131a reflects components of the received OCDM signal with wavelengths $\lambda 2$, $\lambda 3$ and $\lambda 4$. The decoder 145 comprised by the first reception portion 131a has the same code (code 1) as the encoder comprised by the first transmission portion 30a, and so signals encoded by the encoding portion 40 comprised by the first transmission portion 30a are decoded by the decoder 145, and the optical pulse signal can be restored as an auto-correlated signal. Signals encoded by the encoding portions comprised by the second through fourth transmission portions 30b to 30d are encoded using codes (code 2 to code 4) different from the code (code 1) of the decoder comprised by the first reception portion 131a, and so the signals encoded by the encoding portion 40 comprised by the first transmission portion 30a are not restored, and are cross-correlated signals.

The decoder 145 comprises unit FBGs which reflect the wavelength components $\lambda 2$, $\lambda 3$ and $\lambda 4$, so that the wavelength component $\lambda 1$ of the optical pulse passes through the decoder 145. The signal passing through the decoder 145 is not decoded, that is, is an encoded signal in the encoded state. Signals encoded using codes indicated by code 2, code 3 and code 4 each comprise a $\lambda 1$ component, and so $\lambda 1$ wavelength components are comprised at three places on the time axis during one period of the optical pulse train in encoded signals passed by the decoder 145 without being reflected.

The encoded signals are sent to the clock extraction circuit 161. The clock extraction circuit 161 comprises a wavelength filter 171, optical amplifier 172a, ASE cutoff filter 172b, first clock signal generation portion 170, and second clock signal generation portion 180.

In addition to the $\lambda 1$ wavelength component, the encoded signals comprise weak $\lambda 2$, $\lambda 3$ and $\lambda 4$ wavelength components which have been passed by the decoder 145 without being reflected. The $\lambda 2$, $\lambda 3$ and $\lambda 4$ wavelength components are eliminated or cut off by the wavelength filter 171. At this time, in order to heighten the effectiveness of elimination or cut off, a first wavelength filter 171a and second wavelength filter 171b, having the same transmission wavelength bands, may be arranged in series as the wavelength filter 171. In the decoder 145, when the reflectance of the λ2, λ3 and λ4 components other than the passed wavelength λ1 can be increased and the λ2, λ3 and λ4 components transmitted by the decoder can be suppressed, a wavelength filter 171 need not be provided in the clock extraction circuit 161.

Encoded signals which have passed through the wavelength filter 171 are input to the optical amplifier 172a and amplified thereat. As the optical amplifier 172a, for example, an erbium-doped optical fiber amplifier (EDFA) can be used. In the erbium-doped optical fiber amplifier, the intensity of Amplified Spontaneous Emission (ASE), amplified by induced emission within the optical fiber, is increased, and noise due to the amplifier is increased. Hence an ASE cutoff filter 172b is placed at the output portion of the optical amplifier 172a, to remove the ASE component. When the optical intensity of the output of the wavelength filter 171 (or when a wavelength filter is not provided in the circuit 161, the optical signal which has passed through the decoder) is considerably high, a configuration may be employed which does not comprise an optical amplifier 172a or ASE cutoff filter 172b.

After passing through the wavelength filter 171, the optical amplifier 172a and ASE cutoff filter 172b, the encoded signals are divided into two signals, which are first encoded signals and second encoded signals. The first encoded signals are input to the first clock signal generation portion 170, and the second encoded signals are input to the second clock signal generation portion 180.

The first clock signal generation portion 170 is configured by connecting, in this order, a photoelectric converter 173 to which the first encoded signals are input, a band-pass filter 175, a limiting amplifier 177, and a first variable delay 179 which outputs the first clock signal. The second clock signal generation portion 180 is configured by connecting, in this order, an intensity modulator 181 to which the second encoded signals are input, a 2R receiver 183, a clock recovery circuit 185, and a second variable delay 187 which outputs the second clock signal.

The first encoded signals sent to the first clock signal generation portion 170 are first sent to the photoelectric converter 173, and are converted into electrical signals by the photoelectric converter 173. As the photoelectric converter (O/E) 173, for example, an arbitrary but preferable well-known photodiode (PD) can be used. The electrical signals output from the photoelectric converter 173 are input to the band-pass filter (BPF) 175. This band-pass filter 175 has a cutoff frequency which corresponds to a data transmission rate determined in advance. For example, when the transmission rate is 10 Gbps, a band-pass filter may be used which passes signals in the vicinity of 10 GHz. This band-pass filter 175 cuts off electrical signals at frequencies different from the frequency of the electrical clock signal generated by the clock generation device (in FIG. 1, the portion indicated by the symbol 26) provided in the OCDM transmission device, and passes electrical signals at the frequency equal to the frequency of the electrical clock signals. At this time, in order to improve the cutoff effect, a first band-pass filter 175a and a second band-pass filter 175b, having the same pass frequency band, may be arranged in series.

Electrical signals output from the band-pass filter 175 are input to the limiting amplifier 177. The limiting amplifier 177 is a circuit which ensures that the amplitude does not exceed a prescribed level. By using the limiting amplifier 177, fluctuations in the intensity of electrical signals (called as intensity jitter) can be reduced.

The output signals from this limiting amplifier 177 have frequency equal to that of the optical pulse train. The first variable delay 179 adjusts the signals output from the limiting amplifier 177 such that the positions on the time axis coincide with those of optical pulses of the second encoded signals, and outputs the resulting signals, as the first clock signals, from the first clock signal generation portion 170.

Here, the first clock signals are extracted from one wavelength component by the wavelength filter 171. Hence compared with clock signals extracted from a plurality of wavelength components as in the prior art, intensity jitter and time jitter are small. The first clock signals are sent to the second clock signal generation portion 180, and are input to the gate of the intensity modulator 181 provided in the second clock signal generation portion 180.

The second encoded signals sent to the second clock signal generation portion 180 are input to the intensity modulator 181. As the intensity modulator 181, a well-known EAM can be used.

The intensity modulator 181 performs modulation of the second encoded signals using the first clock signals, and extracts one optical pulse in each period of the optical pulse train. That is, the intensity modulator 181 performs time gate processing. The output of the intensity modulator 181 is input to the optical amplifier 182a, and is amplified by the optical amplifier 182a. As the optical amplifier 182a, for example, an erbium-doped optical fiber amplifier can be used. An ASE cutoff filter 182b is placed at the output portion of the optical amplifier 182a to remove the ASE component of the optical amplifier 182a. The optical signal with ASE component removed is then converted into an electrical clock signal. It is preferable to perform this conversion using a 2R receiver 183 and Clock Data Recovery (CDR) 185, in order to further reduce time jitter.

The signal with ASE component removed by the ASE cutoff filter 182b is input to the 2R receiver 183, to perform reshaping and regeneration. As the 2R receiver 183, for example, model R602 (a product name) manufactured by Discovery Semiconductors, Inc. can be used. The output from the 2R receiver 183 is input to the CDR 185. As the CDR 185, for example, a MOS43CM (a product name) manufactured by NTT Electronics Corp. can be used. The second variable delay 187 adjusts the output signals of the CDR 185 to keep them and the optical pulses of the decoded signals in time coincidence, respectively, and outputs the result, as second clock signals, from the second clock signal generation portion 180 to the time gate processor 150.

The second clock signals are generated based on the first clock signals, time jitter and intensity jitter in which have been reduced, so that time jitter and intensity jitter can be further reduced.

Signals decoded by the decoding portion 141 are input to the time gate processor 150. The second clock signals are input to the gate of the time gate processor 150, and only auto-correlated signals are extracted from the time gate processor 150.

As explained above, according to an OCDM receiving device of this invention, optical pulses extracted using the first clock signals are used to generate second clock signals, and the second clock signals, with time jitter suppressed, are used to perform time gate processing. As a result, time jitter and intensity jitter, which in the prior art have been observed in auto-correlated signals after time gate processing, can be reduced.

Further, as the decoder 145, an example was explained which selectively passes one wavelength component among the four wavelength components λ1 to λ4 comprised by three-wavelength code, quad-multiplexed OCDM signals and is used in clock extraction. However, in the case of an FBG-type decoder, even when a configuration is employed in which the four wavelengths are all reflected and decoded, normally a transmitted component exists. Hence an OCDM receiving device used in reception of three-wavelength code, quad-multiplexed OCDM signals can also be applied to four-wavelength code, quad-multiplexed OCDM signals.

Processing of signals output from the time gate processor 150 can be performed using an arbitrary but suitable well-known device. Here, a case will be explained in which an optical amplifier 152a, ASE cutoff filter 152b, and photoelectric converter 190 are connected, in this order, to the output portion of the time gate processor 150.

The output of the time gate processor 150 is input to the optical amplifier 152a and amplified. As the optical amplifier 152a, for example, an erbium-doped optical fiber amplifier can be used. An ASE cutoff filter 152b is placed at the output portion of the optical amplifier 152a, to remove the ASE components. The signals output from this time gate processor 150 are input to the photoelectric converter 190, and after conversion into electrical signals (indicated by an arrow S38a in the figure), are output as received signals.

The reception waveform after time gate processing using a receiving device of the prior art, and the reception waveform in a receiving device of this invention, will be explained referring to FIG. 7. FIG. 7A and FIG. 7B show the respective eye diagrams of received signals in a receiving device of the prior art, explained referring to FIG. 3, and of received signals in a receiving device of this invention, explained referring to FIG. 6. In FIG. 7A and FIG. 7B, the horizontal axis represents time (ps), and the vertical axis shows the signal intensity in arbitrary units (a.u.). Compared with received signals in a receiving device of the prior art (FIG. 7A), jitter is suppressed in the received signals in a receiving device of this invention (FIG. 7B) in both the time direction (horizontal direction) and in the intensity direction (vertical direction), and sufficient eye opening is obtained.

Figure 8A:
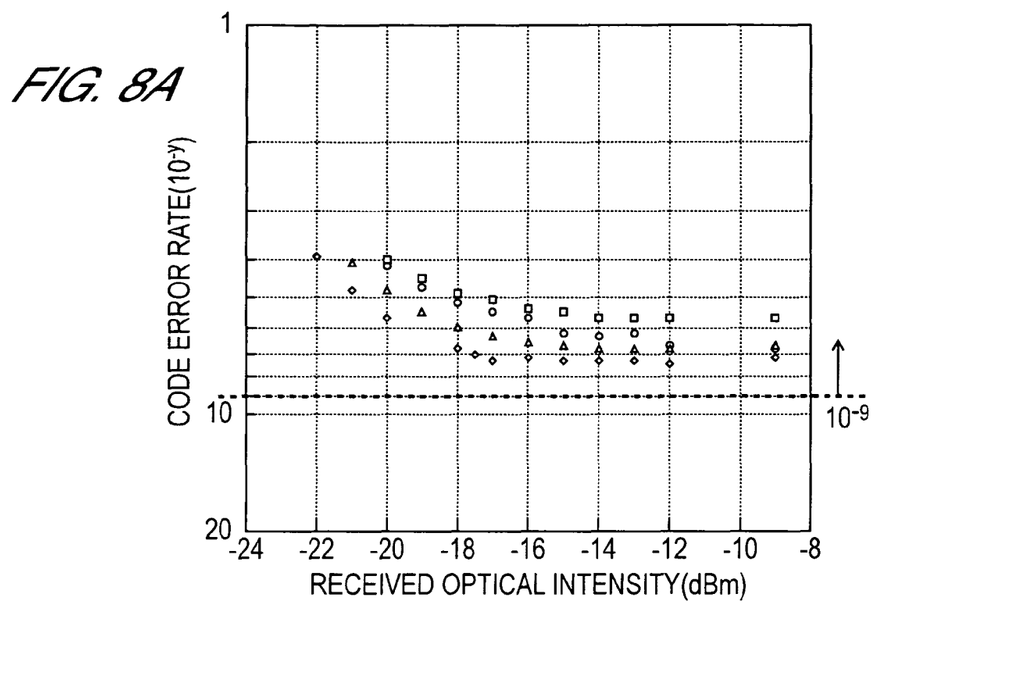
FIG. 8A shows the code error rate in a receiving device of the prior art.
Figure 8B:
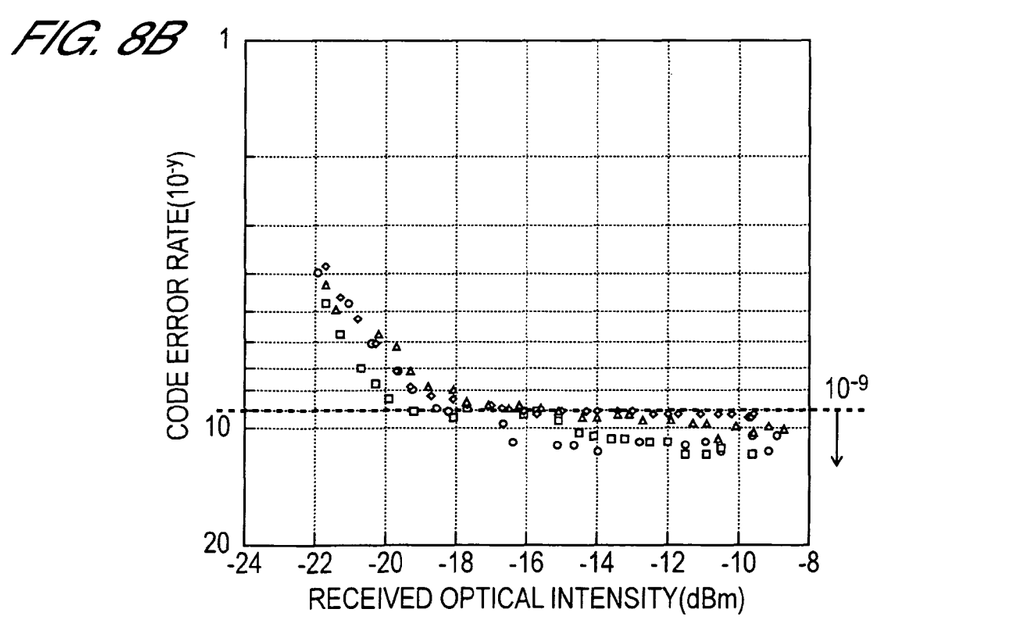
FIG. 8B shows the code error rate in a receiving device of this invention; and, FIG. 9 is a block diagram showing another example of the configuration of an OCDM receiving device of this invention.

FIG. 8A and FIG. 8B show threshold value dependence of code error rates. The horizontal axis indicates the received optical signal intensity (dBm), and the vertical axis indicates the code error rate. FIG. 8A shows the code error rate in a receiving device of the prior art explained referring to FIG. 3, and FIG. 8B shows the code error rate of a receiving device of this invention, explained referring to FIG. 6. In FIG. 8A and FIG. 8B, the circle, square, triangle and diamond symbols indicate the measurement results for each channel in quad-multiplexing. In the receiving device of the prior art, the code error rate is higher than $10^{-9}$ at all received optical intensities. On the other hand, in the receiving device of this invention, the code error rate is lower than $10^{-9}$ when the received optical intensity is −16 dBm or higher. That is, the code error rate is reduced.

Figure 9:
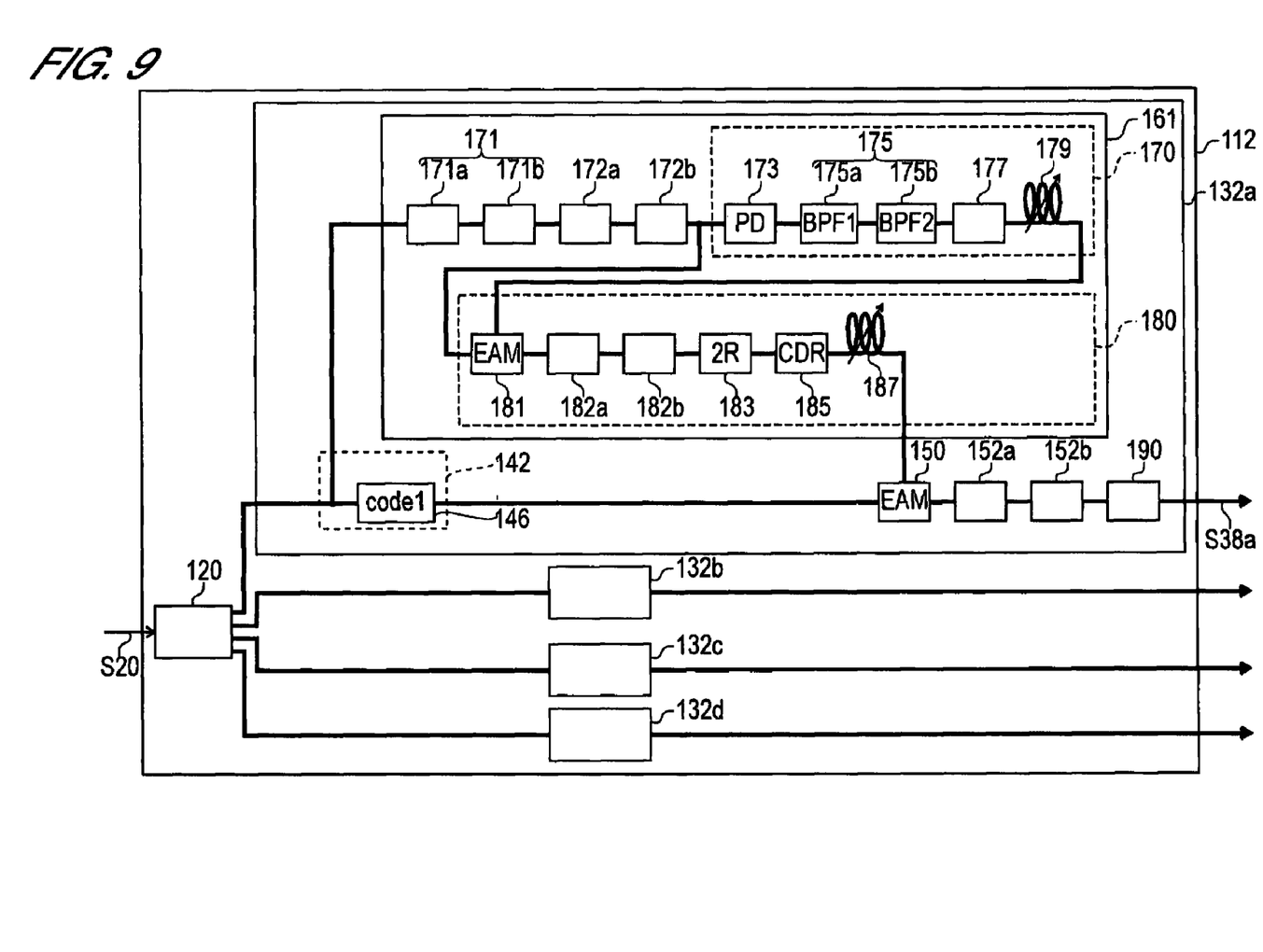

Here, a configuration was explained in which a fiber Bragg grating was used as a decoder, and optical signals passed by the decoder were used as encoded signals; but the invention is not limited to this example. FIG. 9 shows another configuration example of an OCDM receiving device of this invention. In this configuration example, OCDM signals are divided by a divider, and are sent to first through fourth reception portions. The OCDM signals sent to the first through fourth reception portions are input to decoding portions 142. In a decoding portion 142, the OCDM signals are divided into two signals, one of which is sent to a decoder 146 and decoded. The other signal is sent to a clock extraction circuit, and clock extraction is performed. As the decoder 146, for example, a decoder configured using a fiber Bragg grating can be used, similarly to the OCDM receiving device explained referring to FIG. 6.

Figure 6:
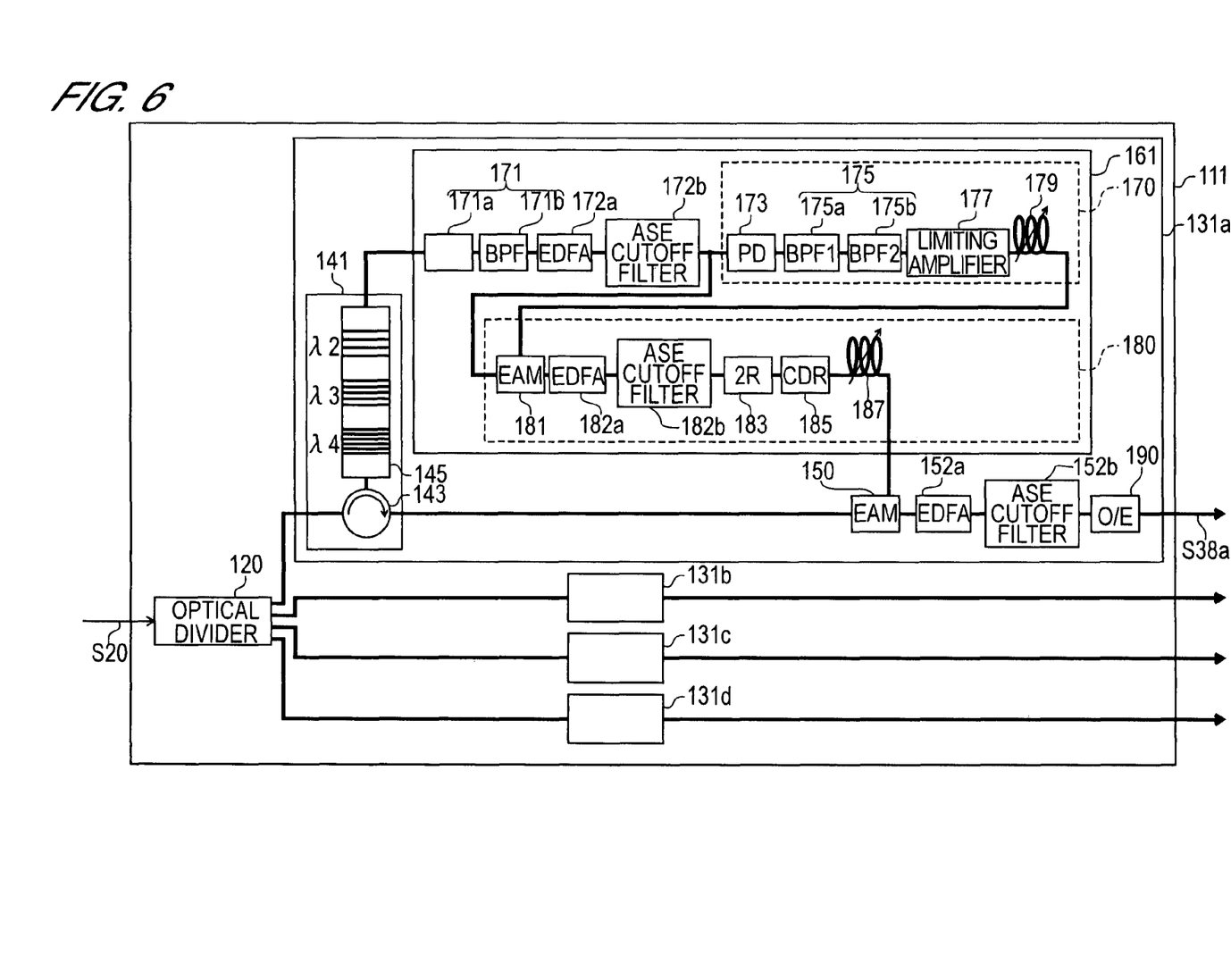
FIG. 6 is a block diagram showing an example of the configuration of an OCDM receiving device of this invention.
Figure 7A:
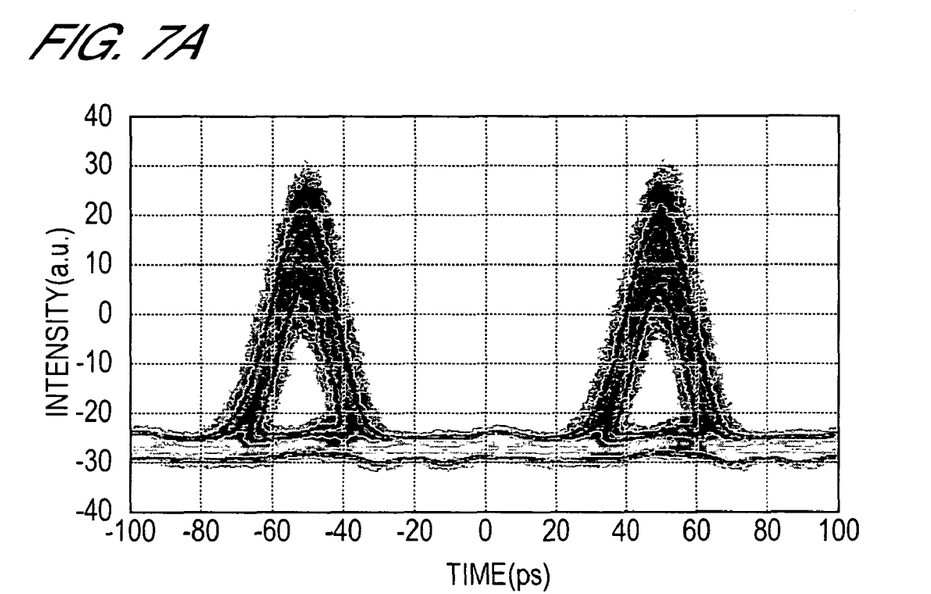
FIG. 7A is an eye diagram of received signals in a receiving device of the prior art.
Figure 7B:
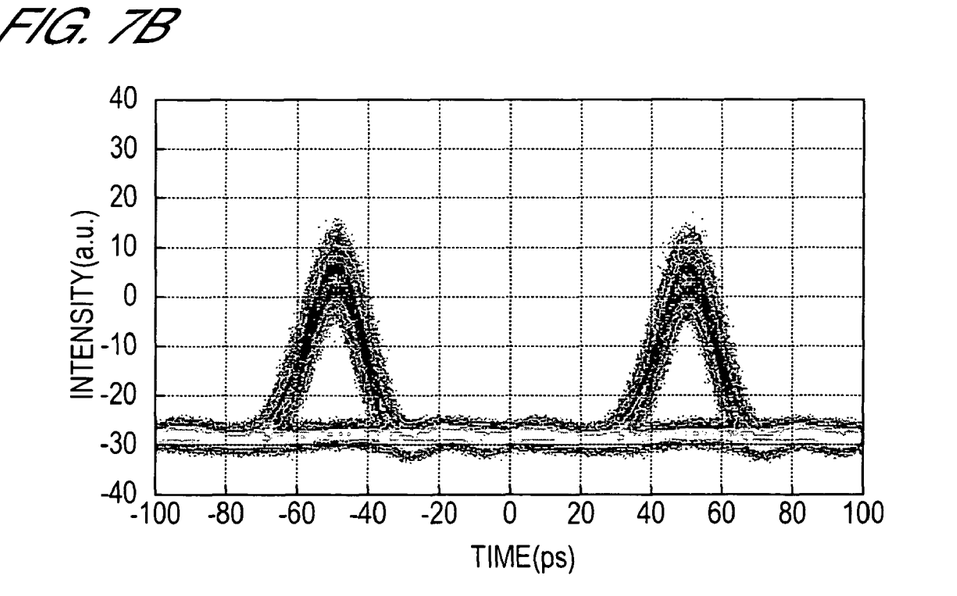
FIG. 7B is an eye diagram of received signals in a receiving device of this invention.

A clock extraction circuit configuration similar to that in the OCDM receiving device explained referring to FIG. 6 can be used. In this way, even when a configuration is employed in which OCDM signals are divided before input to decoders and are then sent to clock extraction circuits, advantageous results similar to those of the device explained referring to FIG. 6 are obtained.

What is claimed is:

1. An optical code division multiplexing receiving device that receives and decodes optical code division multiplexed signals encoded by a time-spreading wavelength-hopping method, comprising:
   a decoding portion for generating decoded signals from the optical code division multiplexed signals and encoded signals in an encoded state from the optical code division multiplexed signals;
   a clock extraction circuit, including
      a first clock signal generation portion, said first clock signal generation portion generating first clock signals from first encoded signals resulting from dual-dividing of said encoded signals, and
      a second clock signal generation portion extracting optical pulses synchronized with said first clock signals from second encoded signals resulting from said dual-dividing of said encoded signals, and generating second clock signals from the extracted optical pulses, said second clock signal generation portion being configured by connecting, in order, an intensity modulator for receiving as input signals said second encoded signals, a 2R receiver, a clock recovery circuit, and a second variable delay for outputting said second clock signals; and,
   a time gate processor for performing time gate processing on said decoded signals using said second clock signals as gate signals to output said decoded signals as received signals.

2. An optical code division multiplexing receiving device that receives and decodes optical code division multiplexed signals encoded by a time-spreading wavelength-hopping method, comprising:
   a decoding portion for generating decoded signals from the optical code division multiplexed signals and encoded signals in an encoded state from the optical code division multiplexed signals;
   a clock extraction circuit, including
      a first clock signal generation portion, said first clock signal generation portion generating first clock signals from first encoded signals resulting from dual-dividing of said encoded signals,
      a second clock signal generation portion extracting optical pulses synchronized with said first clock signals from second encoded signals resulting from said dual-dividing of said encoded signals, and generating second clock signals from the extracted optical pulses, and
   a wavelength filter for dividing said encoded signals passing therethrough into the first encoded signals and the second encoded signals to send the first encoded signals and the second encoded signals to said first clock signal generation portion and second clock signal generation portion, respectively; and
   a time gate processor for performing time gate processing on said decoded signals using said second clock signals as gate signals to output said decoded signals as received signals.

* * * * *